United States Patent
Abzakh

(10) Patent No.: US 10,191,827 B2
(45) Date of Patent: Jan. 29, 2019

(54) METHODS, SYSTEMS, AND COMPUTER READABLE MEDIA FOR UTILIZING LOOPBACK OPERATIONS TO IDENTIFY A FAULTY SUBSYSTEM LAYER IN A MULTILAYERED SYSTEM

(71) Applicant: SanDisk Technologies LLC, Plano, TX (US)

(72) Inventor: Edris Abzakh, Rehaniya (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 150 days.

(21) Appl. No.: 15/250,843

(22) Filed: Aug. 29, 2016

(65) Prior Publication Data
US 2018/0062970 A1  Mar. 1, 2018

(51) Int. Cl.
| | |
|---|---|
| H04L 12/26 | (2006.01) |
| G06F 11/20 | (2006.01) |
| G06F 11/30 | (2006.01) |
| H04L 12/24 | (2006.01) |

(52) U.S. Cl.
CPC ...... *G06F 11/3006* (2013.01); *G06F 11/2007* (2013.01); *H04L 41/0677* (2013.01); *H04L 43/10* (2013.01)

(58) Field of Classification Search
CPC ..... H04L 43/50; H04L 43/14; H04L 12/4645; H04L 1/243; H04L 67/1008; H04L 67/2842; H04L 45/00; H04L 45/22; H04L 45/28; H04L 45/42; G01R 31/3177
See application file for complete search history.

(56) References Cited

U.S. PATENT DOCUMENTS

| | | | | |
|---|---|---|---|---|
| 2003/0221141 A1* | 11/2003 | Wenisch | ............ | G06F 11/1438 714/47.1 |
| 2006/0045021 A1* | 3/2006 | Deragon | ................ | H04L 1/243 370/249 |
| 2015/0103673 A1* | 4/2015 | Shimada | ............ | H04L 41/0893 370/241.1 |

\* cited by examiner

*Primary Examiner* — Awet Haile
(74) *Attorney, Agent, or Firm* — Kunzler, PC

(57) ABSTRACT

Methods, systems, and computer readable media for utilizing loopback operations to identify a faulty subsystem layer in a multilayered system are disclosed. One method includes executing a plurality of loopback operations at a respective plurality of loopback points positioned among subsystem layers of a multilayered system and detecting a failed loopback operation among the plurality of loopback operations. The method further includes identifying a faulty subsystem layer among the subsystem layers by comparing the failed loopback operation and a previously conducted successful loopback operation corresponding to a preceding subsystem layer that is adjacent to the faulty subsystem layer within the multilayered system.

20 Claims, 5 Drawing Sheets

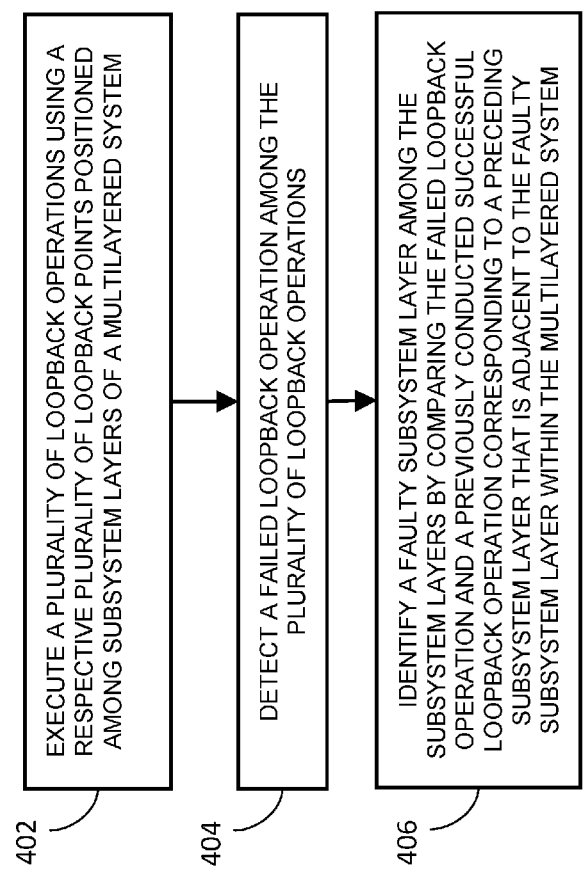

500

1) Establish Iterations
2) Define Layer = 0
3) Establish Loop (layers)
 a) Activate Loopback point (layer)
 b) Establish time_start = measure current time
 c) Try
  i) Loop (Iterations)
   1) Execute Loopback command
 d) Catch error and/or functional failure
 e) Establish time_end = measure current time
 f) Calculate IOPS = 100000 / (time_end – time_start)
 g) Verify IOPS results
4) Record/Print functional errors if functional failure occurs
5) Record/Print IOPS results

FIG. 5

METHODS, SYSTEMS, AND COMPUTER READABLE MEDIA FOR UTILIZING LOOPBACK OPERATIONS TO IDENTIFY A FAULTY SUBSYSTEM LAYER IN A MULTILAYERED SYSTEM

TECHNICAL FIELD

The subject matter described herein relates to implementing multiple loopback levels using a plurality of loopback commands. More particularly, the subject matter described herein includes method, systems, and computer readable media for utilizing loopback operations to identify a faulty subsystem layer in a multilayered system.

BACKGROUND

At present, there are several approaches widely utilized by testing equipment operators to analyze and remedy functional and performance issues that typically arise in a multilayered or multi-process system. For example, an operator may analyze the output log files of each subsystem layer or element within the multilayered system. Further, the operator may also analyze the outputs of standard protocol analyzers for protocols and standards, such as transmission control protocol (TCP) or universal serial bus (USB). In addition, an operator may debug each subsystem layer and proceed to a subsequent lower layer once the current layer has been confirmed to be acceptable/OK. Lastly, an operator may also debug several subsystems in a parallel manner using different developmental environments and/or various types of engineering personnel. However, all of the aforementioned approaches for analyzing and remedying multilayered or multi-process systems either consume a considerable amount of operator time and/or expend a significant amount of system resources.

BRIEF DESCRIPTION OF THE DRAWINGS

The subject matter described herein will now be explained with reference to the accompanying drawings of which:

FIG. 4 is a flow chart illustrating an exemplary process for utilizing loopback operations to identify a faulty subsystem layer in a multilayered system; and FIG. 5 illustrates an exemplary algorithm for utilizing loopback operations to identify a faulty subsystem layer in a multilayered system.

DETAILED DESCRIPTION

The subject matter described herein includes method, systems, and computer readable media for utilizing loopback operations to identify a faulty subsystem layer in a multilayered system. As used herein, the term "loopback operation" refers to the generation and routing of electronic signals, digital data streams, or packet flows back to an originating source without any intentional processing or modification via an established loopback channel. Notably, the loopback operation may be utilized as a means for testing the transmission infrastructure of a device, system, and/or network. The disclosed subject matter is intended to simplify and expedite the process of debugging functional and/or performance failures in a complex multilayered and/or multi-process system. Such a multilayered system may include several software subsystems that communicate with each other via hardware-based links (e.g., USB, TCP, etc.) or software based links, such as software pipelines and shared memory channels.

In some embodiments, the disclosed subject matter implements multiple loopback levels and utilizes one or more loopback commands that match the actual software complexity that is present in the multilayered system. Notably, the multilayered system is designed in such a way that the subsystem layers are individually and sequentially subjected to a loopback operation at system startup. For example, a dedicated loopback command may be injected into the multilayered system and is subsequently handled and executed by all of the subsystem layers preceding (i.e., "above") the loopback point via a loopback channel, thereby enabling the prompt identification of performance and functional failures in the subsystem layers preceding the loopback point. Further, the process can be repeated with different loopback point until a failed or faulty layer is identified.

Figure 1:
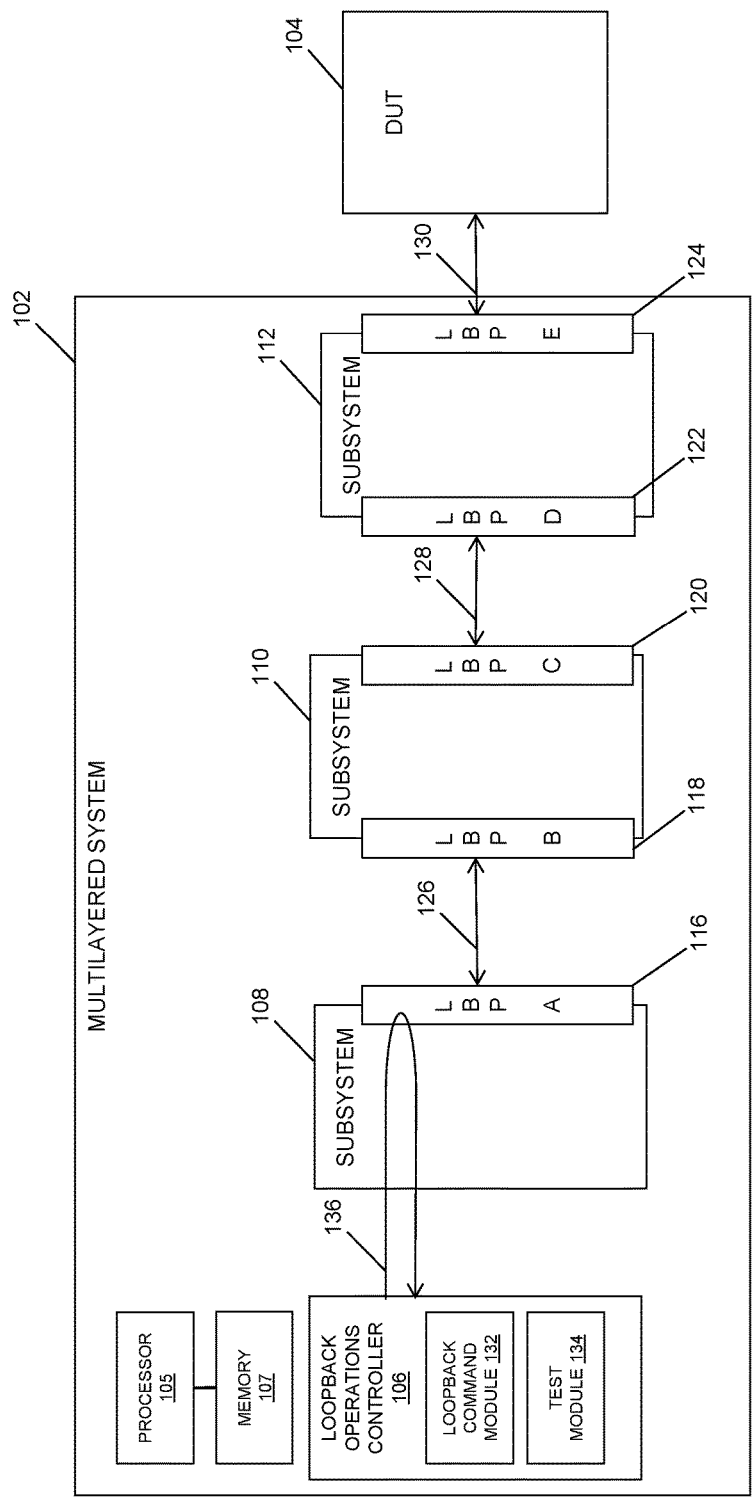
FIG. 1 is a block diagram of multilayered system including loopback points through which loopback operations can be performed.

FIG. 1 is a block diagram of a multilayered system 102 that is communicatively coupled to a device under test (DUT) 104 via communications link 130. Although multilayered system 102 shown in FIG. 1 comprises a testing equipment system configured to apply various performance tests to DUT 104, multilayered system 102 may comprise any multilayered system or device without departing from the scope of the disclosed subject matter. In some embodiments, multilayered system 102 includes a plurality of subsystem layers 108-112. Notably, each of subsystem layers 108-112 may comprise a hardware component (e.g., a central processing unit, a single board computer (SBC), a field programmable gate array (FPGA) based device, a memory device, etc.) and/or a software component (e.g., a software-based layer or a software application executed on a computing device).

As shown in FIG. 1, subsystem layers 108-112 may be communicatively connected to each other via communications links 126-128. In some embodiments, each of communications links 126-128 may comprise a hardware-based link or connection, such as a USB link, a TCP link, or the like. In other embodiments, communications links 126-128 make comprise software-based links or connections, such as a software pipelines, shared memory channels, or the like. Further, each of subsystem layers 108-112 may utilize various application programming interfaces (APIs) and protocols to establish and communicate information over communications links 126-128.

In some embodiments, multilayered system 102 may comprise any computing platform or system that includes one or more processors and memory and is configured to communicate with DUT 104. For example, multilayered system 102 may be a carrier grade or retail grade computing device that interfaces with a flash based DUT and operates as either a self-contained computing environment or a network accessible computing environment. In some embodiments, multilayered system 102 may comprise any of a mobile device, a smartphone device, a personal computer, a computer server, a cloud computer, a large/hyper scale storage appliance, or any combination thereof.

In some embodiments, DUT 104 may include a memory storage device, such as a flash memory based storage system that is either removable or imbedded within a host device. For example, DUT 104 may be a solid state drive (SSD) or hybrid storage medium that includes solid state components in combination with disk storage components. As illustrated in FIG. 1, DUT 104 is connected to multilayered system 102 via a communications link 130, which may function as a communications bus. In one example, communications link 130 comprises a PCIe bus which enables multilayered system 102 and DUT 104 to communicate using any suitable protocol, such as non-volatile memory express (NVMe).

As shown in FIG. 1, multilayered system 102 may further include one or more processors 105 and memory 107. Processor 105 may comprise a microprocessor, central processing unit, or any other like hardware based processor unit that is configured to execute and/or utilize loopback operations controller 106 and/or the modules in loopback operations controller 106. Each of loopback operations controller 106 and/or the depicted modules 132-134 in loopback operations controller 106 may be stored in memory 107, such as random access memory (RAM), read only memory (ROM), optical read/write memory, cache memory, magnetic read/write memory, flash memory, and the like.

In some examples, multilayered system 102 includes a loopback operations controller 106. Loopback operations controller 106 may comprise a hardware and/or software-based component that is configured to facilitate a plurality of loopback operations within multilayered system 102. Further, loopback operations controller 106 may be configured to apply performance degradation tests and loopback regression tests to subsystem layers 108-112. In some embodiments, loopback operations controller 106 may issue a loopback command into one or more subsystem layers 108-112. Notably, the loopback command is a protocol command used to initiate a loopback operation, which involves establishing a loopback channel traversing one or more subsystem layers 108-112 via a loopback point. As used herein, a loopback point may include any physical and/or logical reference point at or within a subsystem layer. For example, a loopback point established in a TCP embodiment may comprise a dedicated loopback IP address (e.g., IP address 127.0.0.1), which is also known as a localhost. Further, a loopback point established in a USB embodiment may utilize a physical port. In some embodiments, the loopback point may be a software-based solution that includes a shared memory channel that establishes a loopback channel via the implementation of a shared memory loopback stub.

As shown in FIG. 1, loopback operations controller 106 includes a loopback command module 132 and a test module 134. Loopback command module 132 may be configured to generate a loopback command that is designed to initiate a loopback operation in a particular subsystem layer. Notably, the loopback command is a special command that is configured in a specific protocol (that is compatible with the loopback point) to initiate a loopback operation at a specific loopback point. For example, in order to initiate a loopback operation, loopback operations controller 106 utilizes loopback command module 132 to issue a loopback command to a specific loopback point (e.g., loopback point A 134). In some embodiments, the loopback command for implementing the loopback channel may be issued by dedicated USB controller firmware maintained in the loopback command module 132 to a USB port in multilayered system 102.

Notably, the loopback command establishes a loopback channel (e.g., loopback channel 101 in FIG. 1) that may be used by loopback operations controller 106 to conduct a performance test. In such case, loopback operation controller 106 subsequently utilizes test module 134 to select a performance test that may be applied via the loopback channel to the one or more subsystem layers corresponding to the loopback point. Notably, test module 134 may include a library of various performance tests that may be applied to a subsystem layer. Examples of performance tests may include a performance degradation test or a functional regression test. For example, test module 134 may be configured to execute a functional regression test that verifies that a subsystem layer (and/or software executed therein) still performs correctly after the subsystem layer was changed. Exemplary changes experienced by a subsystem layer may include software enhancements, patches, configuration changes, and the like. As a testing is conducted by a loopback operations controller, new software bugs or regressions may be uncovered. On occasion, a software change impact analysis may be performed to determine what areas could be affected by the proposed changes. These areas may include functional and non-functional areas of the system. Further, test module 134 may be equipped to conduct tests regarding performance degradation, i.e. to ensure that the throughput and/or response times after some long period of sustained activity are as good as or better than at the beginning of the test.

Test module 134 may also contain performance benchmark information corresponding to each of the loopback points established among the subsystem layers 108-112 for each of the performance tests. In particular, loopback operations controller 106 may use this information to determine whether a measured performance test result for a particular loopback point meets or exceeds the expected performance level defined by the performance benchmark information. Based on a comparison of the measured performance test results and the performance benchmarks information, loopback operations controller 106 may identify a failed or faulty subsystem layer (e.g., failed and/or faulty subsystem element/device or failed and/or faulty communications link). Some exemplary fault scenarios that may be detected by loopback operations controller 106 may include receiving, from test module 134, i) a report indicating that a timeout caused by either the communication is non-functional (e.g., broken) or one of the subsystem elements was unresponsive and/or failed to handle a command correctly (e.g., due to a software bug), ii) a report that indicates a fatal error corresponding to an access violation as a result of faulty software (e.g., due to a software bug), and iii) a report that indicates a fatal error corresponding to a bad memory allocation failure due to the consumption of all the memory resources in one of the subsystems (e.g., due to a memory leak caused by a software bug).

Figure 2:
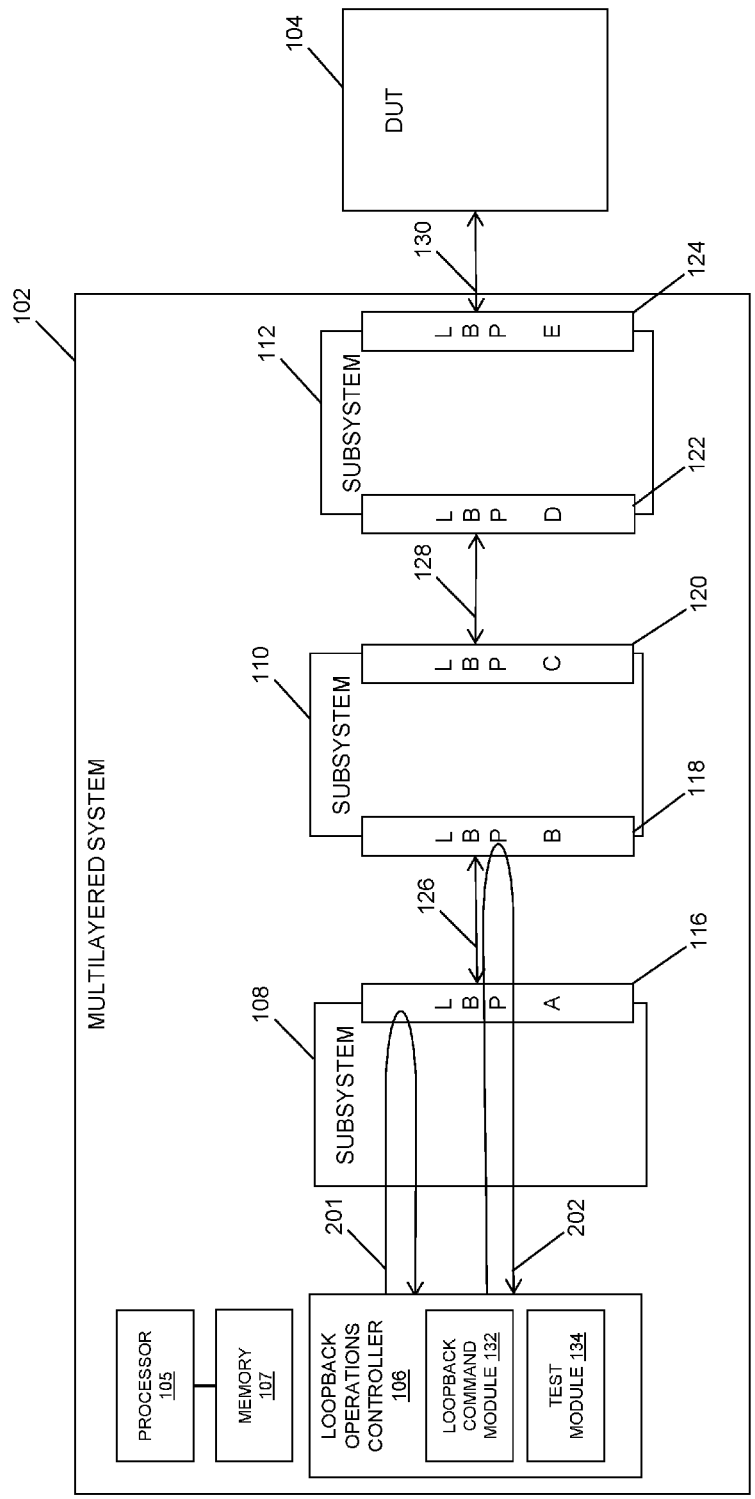
FIG. 2 is a block diagram of a multilayered system including a plurality of subsystem layers with loopback points facilitating loopback operations that execute loopback performance tests.

FIG. 2 is a block diagram of a multilayered system including a plurality of subsystem layers with loopback points facilitating loopback operations that execute loopback performance tests. In particular, FIG. 2 depicts the utilization of a plurality of loopback channels used to identify performance degradation in a communication channel between two subsystem layers within a multilayered system. For example, loopback operations controller 106 may be configured to conduct a first loopback operation that includes both executing a performance degradation test and activating a loopback channel via a loopback command. In some embodiments, loopback command module 132 issues a loopback command (e.g., at system startup) that is configured to establish a loopback channel 201 that traverses multilayered system 102 up to and including loopback point A 116. Notably, loopback point A 116 resides entirely in subsystem layer 108 (i.e., excluding adjacent communications link 126). After loopback command module 132 issues the loopback command, loopback operations controller 106 executes the performance test on subsystem layer 108 via loopback channel 201. For example, a performance test executed by loopback operations controller 106 may include an input/output operations per second (IOPS) performance test that is accessed from test module 134. Namely, loopback operations controller 106 may be configured to initiate a time clock and subsequently generate a defined number of operations or commands specified by the selected performance test. Notably, the operations or commands are communicated by loopback operations controller 106 to loopback point A 116 via the loopback channel 201 until the designated amount of operations is processed and/or upon the expiration of a predefined time period specified by the performance test. In both test scenario, loopback operations controller 106 may utilize the number of operations communicated within the elapsed time period to determine an operations per second (IOPS) value or score (e.g., 10,000 operations per second). Loopback operations controller 106 may then compare the determined IOPS performance test result to an expected performance test value, such as a predefined benchmark score.

In the event the loopback operations controller 106 determines that the performance result does not equal or exceed the expected performance test value defined by the performance test (e.g., 10,000 measured operations per second vs. 12,000 operations per second benchmark), then the performance result associated with the first loopback operation is designated as unsatisfactory or a failure. As such, loopback operations controller 106 utilizes the unsatisfactory performance results to designate the associated subsystem layer (e.g., subsystem layer 108) as faulty or deficient.

Conversely, if loopback operations controller 106 determines that the performance result equals or exceeds the expected performance value (e.g., 10,000 measured operations per second vs. 8,000 operations per second benchmark), then the performance result associated with the first loopback operation is designated as satisfactory (i.e., OK). Further, loopback operations controller 106 utilizes the satisfactory performance result to designate the associated subsystem layer (e.g., subsystem layer 108 which corresponds to loopback point A 116) as performing in a satisfactory manner. At this time, loopback operations controller 106 may be configured to terminate the first loopback operation and automatically initiate a second loopback operation. For example, loopback command module 132 may issue a second loopback command that is configured to establish a loopback channel 202 that traverses multilayered system 102 up to and including loopback point B 118. Notably, loopback point B 118 includes both subsystem layer 108 and communications link 126 (i.e., excluding subsystem layer 110). After issuing the second loopback command, loopback operations controller 106 accesses and conducts the same performance test (i.e., the same IOPS performance test utilized in the first loopback operation on subsystem layer 108 only) on subsystem layer 108 and communications link 126. As previously indicated, the performance test operations are communicated by loopback command module 132 to loopback point B 118. Loopback operations controller 106 may then calculate a performance test score that is subsequently compared too an expected performance test value. If loopback operations controller 106 determines that the performance result equals or exceeds the expected performance value, and the performance results associated with the second loopback operation is designated as satisfactory. However, loopback operations controller 106 determines that the performance result does not equal or exceed the expected performance test value, then the performance result associated with the second loopback operation is designated as unsatisfactory or a failure. For example, if the performance result falls below an expected performance test result, then the unsatisfactory result may serve as a clear indication that the failed or faulty link involves the communications link or channel (e.g., communications link 126) established between the first subsystem layer 108 and the second subsystem layer 110. Notably, loopback operations controller 106 utilizes the unsatisfactory performance results to designate the identified communications link 126 as faulty or a failed link since subsystem layer 108 was previously deemed to be satisfactory based on the results of the first loopback operation. Although FIG. 2 only depicts the utilization of loopback channel 201 and loopback channel 202, other loopback channels may be progressively utilized (e.g., a third loopback operation that utilizes loopback point C 120, a fourth loopback operation that utilizes loopback point 122, and a fifth loopback operation that utilizes loopback point 124 in FIG. 2).

Figure 3:
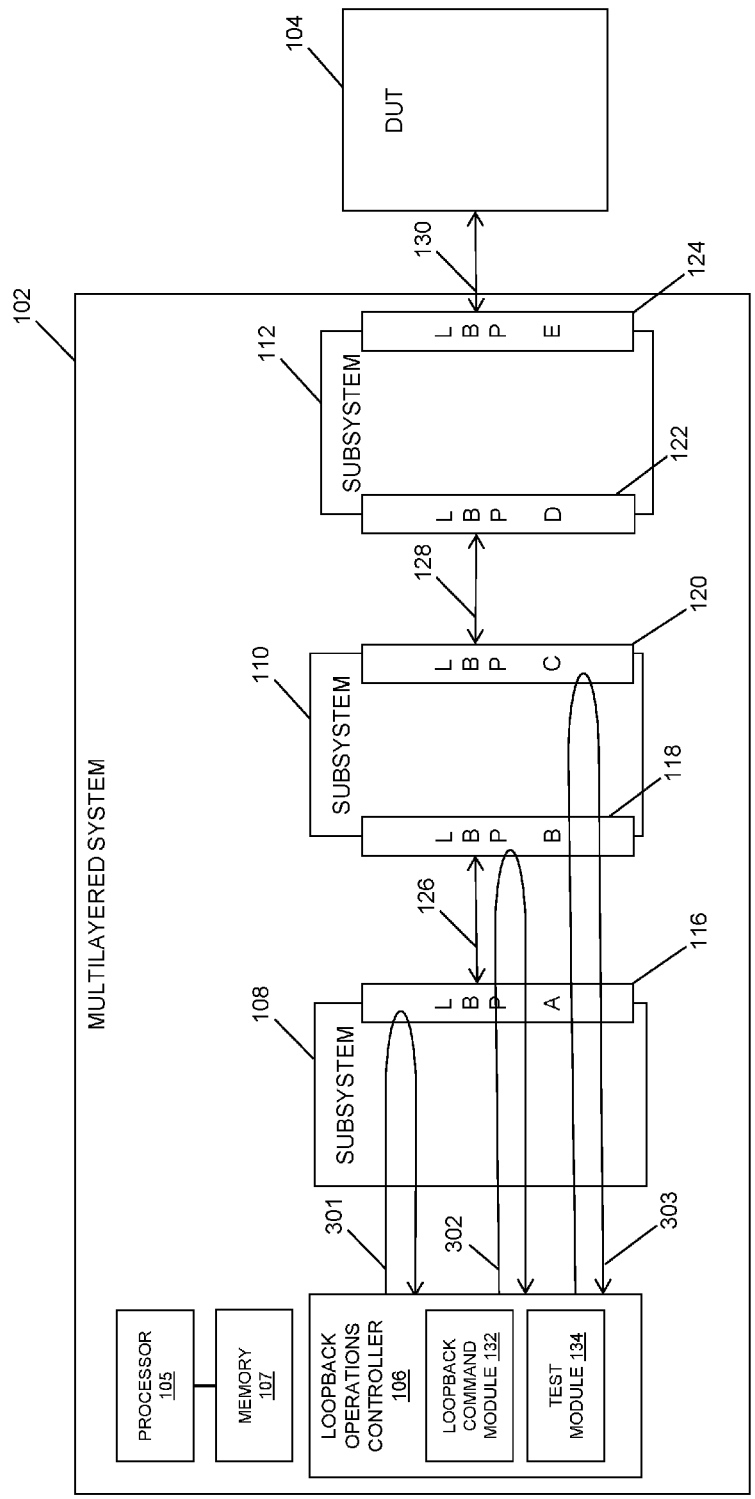
FIG. 3 is a block diagram of a multilayered system including a plurality of subsystem layers with loopback points facilitating loopback operations that execute functional regression tests.

FIG. 3 is a block diagram of a multilayered system including a plurality of subsystem layers with loopback points facilitating loopback operations that execute functional regression tests. In particular, FIG. 3 depicts the identifying of a functional failure among the subsystem layers within multilayered system 102. For example, loopback operations controller 106 may be configured to conduct a first loopback operation that includes both executing a loopback regression test and activating a loopback channel (e.g., loopback channel 301). In some embodiments, loopback operations controller 106 via loopback command module 132 issues a loopback command (e.g., at system startup) that is configured to establish loopback channel 301 that traverses multilayered system 102 up to and including loopback point A 116. Notably, loopback point A 116 resides entirely in subsystem layer 108 (i.e., excluding adjacent communications link 126). After loopback command module 132 issues the loopback command, loopback operations controller 106 utilizes test module 134 to access a loopback regression test. Loopback operations controller 106 subsequently executes the loopback regression test on subsystem layer 108 via loopback channel 301. For example, the loopback regression test executed by loopback operations controller 106 may be configured to initiate a functional test by which failure is determined by the issuance of a timeout or the return failure status of a test command to be executed. Similarly, success of the functional test may be determined based on the application of the functional test on the subsystem layer and the subsequent completion of the regression test in the absence of an issued time out or failure of a test command. More specifically, in the event the loopback operations controller 106 determines that the regression test does result in an issuance of a timeout or a command failure (e.g., command return failure status) over loopback channel 301, then the regression test result associated with the first loopback operation is designated by loopback operations controller 106 as unsatisfactory or a failure. As such, loopback operations controller 106 utilizes the unsatisfactory regression result as the basis to designate the associated subsystem layer 108 as faulty or deficient. As indicated above, in some embodiments, loop back operations controller 106 may be configured to receive, from test module 134, i) a report indicating that a timeout caused by either the communication is non-functional (e.g., broken) or one of the subsystem elements was unresponsive and/or failed to handle a command correctly (e.g., due to a software bug), ii) a report that indicates a fatal error corresponding to an access violation as a result of faulty software (e.g., due to a software bug), and iii) a report that indicates a fatal error corresponding to a bad memory allocation failure due to the consumption of all the memory resources in one of the subsystems (e.g., due to a memory leak caused by a software bug).

Conversely, if loopback operations controller 106 determines that the regression test as satisfactory (i.e., OK), loopback operations controller 106 may utilize the satisfactory performance result as the basis to designate the associated subsystem layer 108 (which corresponds to loopback point A 116 and loopback channel 302) as performing in a satisfactory manner. At this time, loopback operations controller 106 may be configured to terminate the first loopback operation and automatically initiate a second loopback operation. For example, loopback command module 132 may issue a second loopback command that is configured to establish a loopback channel 302 that traverses multilayered system 102 up to and including loopback point B 118. Notably, loopback point B 118 includes both subsystem layer 108 and communications link 126 (i.e., excluding subsystem layer 110). After issuing the second loopback command, loopback operations controller 106 executes the same regression test on both subsystem layer 108 and communications link 126 (i.e., the same regression test conducted for the first loopback operation on subsystem 108). As previously indicated, the regression test operations or commands are communicated by loopback operations controller 106 to loopback point B 118. Loopback operations controller 106 may then determine the regression test result based on the detection, or absence, of an issued timeout or a failed command status.

If loopback operations controller 106 determines that the regression test result associated with the second loopback operation is designated as satisfactory, the loopback operations controller 106 designates communications link 126 as satisfactory. However, if loopback operations controller 106 detects an issued timeout or command return failure status, then communications link 126 is designated as a failed or faulty link (i.e., subsystem 108 was previously deemed satisfactory).

At this time, loopback operations controller 106 may be configured to terminate the second loopback operation and automatically initiate a third loopback operation. For example, loopback command module 132 may issue a third loopback command that is configured to establish a loopback channel 303 that traverses multilayered system 102 up to and including loopback point C 120. Notably, loopback point C 120 includes subsystem layer 108, communications link 126, and subsystem 110 (i.e., excluding communications link 128). After issuing the third loopback command, loopback operations controller 106 executes the same regression test on subsystem layer 108, communications link 126, and subsystem layer 110 (i.e., the same regression test conducted for the first loopback operation on subsystem 108 and the same regression test conduct for the second loopback operation on subsystem 108 and communications link 126). As previously indicated, the regression test operations or commands are communicated by loopback operations controller 106 to loopback point C 120. Loopback operations controller 106 may then determine the regression test result based on the detection, or absence, of an issued timeout or a failed command status.

If loopback operations controller 106 determines that the regression test result associated with the third loopback operation is designated as satisfactory, the loopback operations controller 106 designates subsystem layer 110 as satisfactory. However, if loopback operations controller 106 detects an issued timeout or command return failure status, then subsystem layer 110 is designated as a failed or faulty link (i.e., subsystem 108 and communications link 126 were previously deemed satisfactory). Although FIG. 3 only depicts the utilization of loopback channels 301-303, other loopback channels may be progressively utilized (e.g., a fourth loopback operation that utilizes loopback point 122 and a fifth loopback operation that utilizes loopback point 124 in FIG. 3).

FIG. 4 depicts an exemplary process 400 for utilizing loopback operations to identify a faulty subsystem layer in a multilayered system. In block 402, a plurality of loopback operations is performed at a respective plurality of loopback points positioned among subsystem layers of a multilayered system. In some embodiments, a loopback operations controller in the multilayered system is configured to conduct a number of loopback operations in a sequential (i.e., separate and individual) basis such that only one loopback operation is executed at any given time. For example, a loopback operation is initiated (e.g., at startup of the multilayered system) via the issuance of a loopback command by loopback operations controller. Such a loopback command is directed to a particular loopback point within the multilayered system, which in turn establishes a loopback channel in which a loopback test (e.g., a performance degradation test or a loopback regression test) may be conducted.

In block 404, a failed loopback operation among the plurality of loopback operations is detected. As indicated above, the loopback operations controller sequentially conducts the loopback operations. Notably, the loopback operations controller initiates and executes a single loopback operation at a time and only after achieving a satisfactory result for the associated subsystem layer(s), does the loopback operations controller terminate the current loopback operation and initiate the next loopback operation associated with the next subsystem layer to be tested. In the event a performance test being conducted fails, the loopback operations controller is configured to detect the corresponding failed loopback operation.

In block 406, a faulty subsystem layer among the subsystem layers is identified by comparing the failed loopback operation and a previously conducted successful loopback operation corresponding to a preceding subsystem layer that is adjacent to the faulty subsystem layer within the multilayered system. For example, the loopback operations controller may detect that a performance test or regression test conducted using a loopback point over the currently established loopback channel failed or produced unsatisfactory test results. As such, the loopback operations controller references the previously tested loopback point (which was tested successfully and/or satisfactorily) and identifies the subsystem layer positioned between the two aforementioned loopback points (i.e., the loopback point associated with the successful loopback operation and the loopback point associated with the unsuccessful loopback operation).

In some embodiments, process 400 may be performed via a software process that is executed by a processor. One exemplary algorithm of such a software process is depicted in FIG. 5. Notably, it is understood that FIG. 5 only illustrates an example algorithm and should not limit the scope of the disclosed subject matter. Referring to FIG. 5, in step 1, the number of command loop iterations is provided by loopback operations controller 106 to test module 134. In step 2, the current loopback point being tested is designated (e.g., 0 corresponds to the first loopback point, 1 corresponds to the second loopback point, etc.). In step 3, the loopback operation for the current loopback point is conducted by test module 134. For example, test module 134 may activate the current loop back point (step 3a), record the start time of the executed loopback test (step 3b), initiate/execute the actual loopback commands (e.g., 10,000 command operations) (step 3c), and detecting or catching any functional failures (in cooperation with loopback command module 132). Test module 134 may also record (step 3e) the current time upon the completion of the executed iterations (e.g., 10,000 command operations), calculate the operations per second (IOPS) based on the time period required to run the 10,000 command operations (step 3f), and verify the IOPS results, e.g., by comparing the calculated IOPS result with a verified threshold IOPS value (step 3g). Test module 134 may then report/print any functions errors that were detected in the even a function failure occurred (step 4) as well as record/print the IOPS test results (e.g., determine/calculate results based on iterations over the time period).

ADVANTAGES

The following advantages may be achieved at least in part by the subject matter described herein. Notably, the disclosed subject matter affords the technical advantage of shortening failure analysis of complex multilayered or multi-process systems by promptly identifying a failing subsystem layer, such as a failed subsystem device or a faulty communications link. Further, the disclosed subject matter also reduces the need for complex development stations that typically require multiple types of debuggers and integrated development environments (IDEs). More specifically, the utilization of multi-level loopback operations in multilayered systems is a cost reduction method due to the overall decrease in the amount of time associated with debugging and validating newly developed systems. As such, the present subject matter may be readily utilized and adopted by commercial manufacturers of test and validation tools, factory control systems, mass production equipment, and the like.

As indicated above, each of subsystem layers 108-112 may comprise a memory device, such as the flash portion of an eMMC device or a UFS device. Further, one or more of subsystem layers 108-112 described herein can be implemented in any suitable NAND flash memory, including 2D or 3D NAND flash memory. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that the subject matter described herein is not limited to the two dimensional and three dimensional exemplary structures described but cover all relevant memory structures within the spirit and scope of the subject matter as described herein and as understood by one of skill in the art.

The subject matter described herein relates to methods, systems, and computer readable media for utilizing loopback operations to identify a faulty subsystem layer in a multilayered system. One method includes executing a plurality of loopback operations at a respective plurality of loopback points positioned among subsystem layers of a multilayered system and detecting a failed loopback operation among the plurality of loopback operations. The method further includes identifying a faulty subsystem layer among the subsystem layers by comparing the failed loopback operation and a previously conducted successful loopback operation corresponding to a preceding subsystem layer that is adjacent to the faulty subsystem layer within the multilayered system.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for utilizing loopback operations to identify a faulty subsystem layer in a multilayered system, the method comprising:
executing a plurality of loopback operations using a respective plurality of loopback points positioned among subsystem layers of a multilayered system, wherein:
the plurality of loopback operations incrementally test loopback points in the plurality of loopback points; and
each loopback operation tests loopback points that have been previously tested during previously executed loopback operations;
detecting a failed loopback operation among the plurality of loopback operations; and
identifying a faulty subsystem layer among the subsystem layers by comparing the failed loopback operation against a previously conducted successful loopback operation corresponding to a preceding subsystem layer that is adjacent to the faulty subsystem layer within the multilayered system.

2. The method of claim 1 wherein the plurality of loopback operations is executed at startup of the multilayered system.

3. The method of claim 1 wherein executing a plurality of loopback operations includes sequentially and separately initiating loopback commands respectively compatible with each of the plurality of loopback points.

4. The method of claim 1 wherein each of the subsystem layers includes either a subsystem device or a communications channel that communicatively couples a plurality of subsystem devices.

5. The method of claim 4 wherein at least one of the subsystem layers includes a central processing unit (CPU).

6. The method of claim 4 wherein the communications channel includes either a hardware-based link or a software-based link between the plurality of subsystem devices.

7. The method of claim 1 wherein detecting a failed loopback operation includes detecting a failure of a performance degradation test applied to the multilayered system or detecting a failure of a loopback regression test applied to the multilayered system.

8. A system for identifying a faulty subsystem layer, the system comprising:
a plurality of subsystem layers in a multilayered system; and
a loopback operations controller in the multilayered system for:
executing a plurality of loopback operations using a respective plurality of loopback points positioned among the subsystem layers;
detecting a failed loopback operation among the plurality of loopback operations; and
identifying a faulty subsystem layer among the subsystem layers by comparing the failed loopback operation against a previously conducted successful loopback operation corresponding to a preceding subsystem layer that is adjacent to the faulty subsystem layer within the multilayered system, wherein:
the plurality of loopback operations incrementally test loopback points in the plurality of loopback points; and
each loopback operation tests loopback points that have been previously tested during previously executed loopback operations.

9. The system of claim 8 wherein the plurality of loopback operations is executed at startup of the multilayered system.

10. The system of claim 8 wherein the loopback operations controller is further configured for sequentially and separately initiating loopback commands respectively compatible with each of the plurality of loopback points.

11. The system of claim 8 wherein each of the subsystem layers includes either a subsystem device or a communications channel that communicatively couples a plurality of subsystem devices.

12. The system of claim 11 wherein at least one of the subsystem layers includes a central processing unit (CPU).

13. The system of claim 11 wherein the communications channel includes either a hardware-based link or a software-based link between the plurality of subsystem devices.

14. The system of claim 8 wherein the loopback operations controller is further configured for detecting a failed loopback operation includes detecting a failure of a performance degradation test applied to the multilayered system or detecting a failure of a loopback regression test applied to the multilayered system.

15. A non-transitory computer readable medium having stored thereon executable instructions that when executed by a processor of a computer control the computer to perform steps comprising:
executing a plurality of loopback operations using a respective plurality of loopback points positioned among subsystem layers of a multilayered system;
detecting a failed loopback operation among the plurality of loopback operations; and
identifying a faulty subsystem layer among the subsystem layers by comparing the failed loopback operation against a previously conducted successful loopback operation corresponding to a preceding subsystem layer that is adjacent to the faulty subsystem layer within the multilayered system, wherein:
the plurality of loopback operations incrementally test loopback points in the plurality of loopback points; and
each loopback operation tests loopback points that have been previously tested during previously executed loopback operations.

16. The non-transitory computer readable medium of claim 15 wherein the plurality of loopback operations is executed at startup of the multilayered system.

17. The non-transitory computer readable medium of claim 15 wherein executing a plurality of loopback operations includes sequentially and separately initiating loopback commands respectively compatible with each of the plurality of loopback points.

18. The non-transitory computer readable medium of claim 15 wherein each of the subsystem layers includes either a subsystem device or a communications channel that communicatively couples a plurality of subsystem devices.

19. The non-transitory computer readable medium of claim 18 wherein at least one of the subsystem layers includes a central processing unit (CPU).

20. The non-transitory computer readable medium of claim 18 wherein the communications channel includes either a hardware-based link or a software-based link between the subsystem devices.

* * * * *